May 23, 1967          JAMES E. WEBB          3,321,628
ADMINISTRATOR OF THE NATIONAL AERONAUTICS
AND SPACE ADMINISTRATION
BASELINE STABILIZATION SYSTEM FOR IONIZATION DETECTOR
Filed Sept. 18, 1964
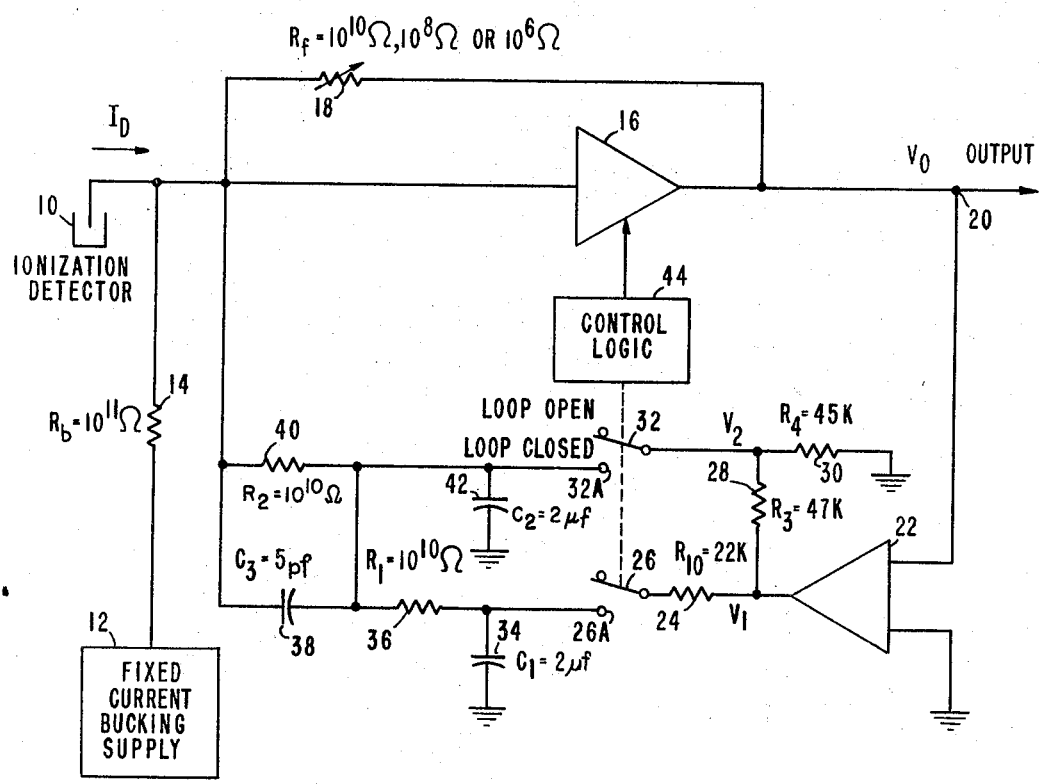
INVENTOR
J HOWARD MARSHALL
BY
ATTORNEY

3,321,628
BASELINE STABILIZATION SYSTEM FOR IONIZATION DETECTOR
James E. Webb, Administrator of the National Aeronautics and Space Administration, with respect to an invention of J. Howard Marshall, Pasadena, Calif.
Filed Sept. 18, 1964, Ser. No. 397,665
2 Claims. (Cl. 250—83.6)

ABSTRACT OF THE DISCLOSURE

This invention substantially eliminates the effects of the quiescent current or drift of an ionization detector by sampling its output just before taking a measurement and storing that output on a capacitor. The output of the capacitor is then applied to an amplifier driven by the ionization detector to null the amplifier output, in the absence of an input. The apparatus is then enabled, so that it may perform a measurement.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to measurement instruments of the type known as ionization detectors and more particularly to improvements therein.

It has been found that the quiescent current of an ionization detector which is used in a gas chromatograph does not remain constant for long periods of time. As a result, either limited observations are made, or, if circumstances are such that this is not possible, then the results which are obtained over a long period of time are at best approximations.

An object of this invention is the provision of a system for substantially eliminating problems arising as a result of the inconstancy of the quiescent current of an ionization detector.

Another object of the present invention is the provision of an arrangement for automatically stabilizing the baseline voltage of an electrometer amplifier preceded by an ionization detector used in a gas chromatograph.

Still another object of this invention is the provision of a novel and useful system for improving the accuracy of an ionization detector which must be used in a gas chromatograph over an extended period of time.

These and other objects of the invention may be achieved in an arrangement wherein provision is made for nulling a quiescent current output of an ionization detector. The value of the nulling voltage is stored on a capacitor. Output is then taken from the capacitor and used for providing a nulling current during time within which the ionization detector is providing readings for the chromatogram.

The novel features that are considered characteristic of this invention are set forth with particularity in the appended claims. The invention itself both as to its organization and method of operation, as well as additional objects and advantages thereof, will best be understood from the following description when read in connection with the accompanying drawing, in which there is shown a circuit diagram of an embodiment of the invention.

The problem of providing automatic baseline stabilization for an ionization detector used in a gas chromatograph has arisen in space craft applications. However, its utilization should not be limited thereto since, as will appear from the description of the invention hereafter, it will be seen that it has practical applications to situations arising in the laboratory.

The system which is employed comprises an ionization detector 10 to which a fixed current is applied from a source 12 through a resistor 14. The output of the ionization detector is applied to an electrometer amplifier 16 which has a variable feedback resistor 18, representative of a resistance network, whereby the electrometer ranges, or the electrometer sensitivity may be established. The output of the electrometer amplifier is applied to a terminal 20.

The arrangement thus far described is a standard one which is well known in the prior art. In accordance with this invention, an amplifier 22 is connected to the output terminal 20. The output of the amplifier is applied to a network which includes a resistance 24 connected between the output of the amplifier 22 on one side of a switch 26. Two resistors respectively 28, 30 are connected between the output of the amplifier and ground. The connection between the two resistors is connected to the swinging arm of a switch 32.

The terminal 26A of switch 26 is connected to one side of a capacitor 34, the other side of which is connected to ground. A resistor 36 is also connected to the one side of the capacitor 34 and has its other side connected to one end of a parallel connected capacitor 38 and resistor 40.

The terminal 32A of the switch 32 is connected to one side of a capacitor 42, the other side of which is connected to ground. The one side of the capacitor 42 is also connected to the one side of the parallel connected resistor 40 and capacitor 38. The other side of the resistor 40 and capacitor 38 is connected back to the output of the ionization detector 10, which is also the input to the electrometer amplifier 16.

In operation, before the instrument is sent off to the destination to which it will be used, the fixed current bucking supply 12 is adjusted to null out the then present ionization quiescent current. The switches 26 and 32 are in the open position at this time. When the instrument reaches its destination, and while only carrier gas flows in the ionization detector, the resistor 18 is placed in the position at which the electrometer is most sensitive. The switches 26 and 32 are then closed. The comparator amplifier 22 functions to provide a value of bucking current through the network now connecting its output back to the output of the ionization detector to have a value such that the electrometer ouput as determined at the output terminal 20 is substantially zero.

As soon as the voltages on the storage capacitors 34, 42 have reached equilibrium, the switches 26, 32 are opened. The gas sample to be analyzed is then injected into the ionization column. During the chromatographic analysis, the voltages on the storage capacitors decay towards zero, resulting in a change of the variable bucking current by less than $10^{-12}$ amperes within thirty minutes.

If the parameters of the stabilization circuit are sufficiently stable, and if the output current of the ionization detector does not change during the chromatogram, then peaks of the same order as the decay of the variable bucking current can be measured by recording the initial output voltage of the comparator amplifier and correcting for the initial value and decay of the baseline. As an additional check on the proper operation of the system, the electrometer output voltage with the loop closed can also be recorded.

The values which were employed in an operative embodiment of the invention are shown in the drawing. These values are by way of illustration and should not be assumed to be a limitation upon the invention. The values of the network are selected to stabilize the overall system against oscillation. The comparator amplifier is a feedback D.C. amplifier with a gain of 2 thousand and a balanced, matched differential input stage.

While the setting of the feedback resistor 18 of the electrometer amplifier and the opening and closing of the switches 26, 32 may be done manually, in operations which occur in outer space, obviously this is not practical. Accordingly, control logic may be employed for performing the necessary switching functions. This control logic is represented by a rectangle entitled "Control Logic" with a reference numeral 44 applied thereto. The initiation of operation of the control logic may be by a signal received from a control station. Logic for initiating a sequence of switching operations of the type described is well known and accordingly will not be described herein.

While the invention described herein arose as a result of the necessity for cancelling the quiescent current of the detector of the chromatograph, the concept is usable wherever a current of extremely small magnitude must be cancelled or balanced out.

There has accordingly been described and shown herein a novel and useful arrangement for stabilizing the baseline current of the output of an ionization detector so that the accuracy of its measurement for a gas chromatograph is improved considerably.

What is claimed is:

1. In a system for obtaining a chromatograph from a gas sample wherein an ionization detector is employed and its output is applied to the input of an electrometer amplifier which has an output, apparatus for stabilizing the baseline output of said ionization detector prior to the measurement of said gas sample comprising a network coupling the output of said electrometer amplifier to the output of said ionization detector including a comparator amplifier having its input connected to the output of said electrometer amplifier, switch means having an open and closed position, resistor means connecting the output of said comparator amplifier to said switch means, storage capacitor means connected to the output of said comparator amplifier when said switch means is in its closed position, means connecting said storage capacitor means to the output of said ionization detector, means operating said switch means to its closed position for charging said capacitor means to a voltage for bucking out the quiescent output of said ionization detector prior to the measurement of said gas sample, and means for opening said switch means when it is desired to measure said gas sample.

2. In a system for obtaining a chromatograph from a gas sample wherein an ionization detector is employed and its output is applied to the input of an electrometer amplifier which has an output, apparatus for stabilizing the baseline output of said ionization detector comprising a network coupled between the output of said electronic electrometer amplifier and the output of said ionization detector, said network comprising a comparator amplifier having an input connected to said electrometer amplifier output and an output, a first and second resistor connected across said comparator amplifier output, a first capacitor, a first switch means having an open position and a closed position for connecting the junction between said first and said second resistor to said first capacitor, a third resistor having one end connected to said comparator amplifier output, a second capacitor, a second switch means having an open position and a closed position for connecting said capacitor to said third resistor other end, and means connecting said first and second capacitors to said electrometer output including a fourth resistor, a third capacitor connected in parallel with said fourth resistor, a fifth resistor connecting said parallel connected fourth resistor and third capacitor to said second capacitor, and a connection between said first capacitor and said parallel connected fourth resistor and third capacitor.

References Cited by the Examiner

UNITED STATES PATENTS 2,768,247  10/1956  Beard et al.
3,131,349  4/1964  Cary et al. _____ 324—123 X RALPH G. NILSON, *Primary Examiner.*

S. ELBAUM, *Assistant Examiner.*